(12) United States Patent
Boubekeur et al.

(10) Patent No.: US 12,548,260 B2
(45) Date of Patent: Feb. 10, 2026

(54) TECHNIQUES FOR TRIANGLE-LEVEL REJECTION SAMPLING IN THREE-DIMENSIONAL OBJECT MESHES

(71) Applicant: Adobe Inc., San Jose, CA (US)

(72) Inventors: Tamy Boubekeur, Paris (FR); Theo Thonat, Issy les Moulineaux (FR); Jérémie Schertzer, Savigny-sur-Orge (FR)

(73) Assignee: Adobe Inc., San Jose, CA (US)

( * ) Notice: Subject to any disclaimer, the term of this patent is extended or adjusted under 35 U.S.C. 154(b) by 60 days.

(21) Appl. No.: 18/643,369

(22) Filed: Apr. 23, 2024

(65) Prior Publication Data

US 2025/0329115 A1 Oct. 23, 2025

(51) Int. Cl.
*G06T 17/20* (2006.01)
*G06T 1/20* (2006.01)

(52) U.S. Cl.
CPC ........... *G06T 17/205* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 2014/0327673 | A1* | 11/2014 | Sousa | G06T 15/506 345/426 |
| 2015/0084953 | A1* | 3/2015 | Luo | G06T 17/00 345/420 |
| 2017/0018111 | A1* | 1/2017 | Collet Romea | G06T 9/00 |
| 2023/0343019 | A1* | 10/2023 | Wald | G06T 15/06 |

OTHER PUBLICATIONS

Cline, David, Anshuman Razdan, and Peter Wonka. 2009, "A comparison of tabular PDF inversion methods". Computer Graphics Forum, vol. 28. Wiley Online Library, pp. 154-160.
Heitz, Eric. 2019. A Low-Distortion Map Between Triangle and Square; Technical Report. Unity Technologies.
Nehab, Diego and Philip Shilane. 2004. Stratified point sampling of 3D models. In Proc. Eurographics Symp. on Point-Based Graphics. pp. 49-56.

(Continued)

*Primary Examiner* — Saptarshi Mazumder
(74) *Attorney, Agent, or Firm* — Kilpatrick Townsend & Stockton LLP

(57) ABSTRACT

A graphics generation computing device applies triangle-level rejection sampling to generate a set of surface mesh point samples. A highly parallelized processor included in the graphics generation computing device generates a triangle-level sampling array that includes triangle-level sampling data for each triangle included in a 3D object mesh. Based on the data in the triangle-level sampling array, the highly parallelized processor determines a quantity of point samples in each triangle. The highly parallelized processor calculates, for each point sample, point sample location data that indicates a location of the point sample on a triangle. The highly parallelized processor modifies a set of point samples to include the location data. In some cases, the set of point samples is used to generate digital fibers or other structure data objects at the point sample locations indicated by the set of point samples.

20 Claims, 5 Drawing Sheets

(56) References Cited

OTHER PUBLICATIONS

Portsmouth, Jamie 2017; "Efficient barycentric point sampling on meshes" CoRR abs/1708.07559 (2017). arXiv:1708.07559 http://arxiv.org/abs/1708.07559.
Quinn, Jonathan, Frank Langbein, Yu-Kun Lai, and Ralph Martin. 2013. Fast Low discrepancy Sampling of Parametric Surfaces and Meshes. https://doi.org/10.13140/RG.2.1.2012.0408.
Sik, Martin and Jaroslav Křivánek. 2013. Fast Random Sampling of Triangular Meshes. In Pacific Graphics Short Papers (Singapore). The Eurographics Association; https://doi.org/10.2312/PE.PG.PG2013short.017-022.
Thonat, Theo, Francois Beaune, Xin Sun, Nathan Carr, and Tamy Boubekeur. 2021. Tessellation-Free Displacement Mapping for Ray Tracing. ACM Trans. Graph. (Proc SIGGRAPH Asia 2021) 40, 6, Article 282 (Dec. 2021), 16 pages. https://doi.org/10.1145/3478513.3480535.
Vose, Michael D.; 1991. A linear algorithm for generating random Nos. with a given distribution, IEEE Transactions on software engineering 17, 9 (1991), pp. 972-975.
Rusinkiewicz, Alexa M., S., Nehab D., Shilane P.: Stratified point sampling of 3d models. In Proc. Eurographics Symp. on Point-Based Graphics (2004), pp. 49-56.
Willems, Sascha, . 2023. Vulkan Hardware Database. https://vulkan.gpuinfo.org/listfeaturescore12.php shaderBufferInt64Atomics feature, accessed: Jan. 24, 2023.
Lehmann, Hans-Peter, et al., Weighted Random Sampling on GPUs, Karlsruhe Institute of Technology, Jun. 23, 2021, 16 pages.

* cited by examiner

TECHNIQUES FOR TRIANGLE-LEVEL REJECTION SAMPLING IN THREE-DIMENSIONAL OBJECT MESHES

TECHNICAL FIELD

This disclosure relates generally to the field of digital graphical environments, and more specifically relates to point sampling techniques.

BACKGROUND

In a three-dimensional ("3D") computer graphical environment, 3D graphical objects can include fibrous surfaces, such as fur, grass, hair, or other types of fibrous structures. The fibrous surfaces can give the 3D graphical objects a realistic appearance within the computer graphical environment. Physical properties of the fibrous structures, such as a density, can be modeled using textures that are mapped onto the surface, such as by using a uv-mapping technique. In some cases, a high-density point sampling technique is used to identify locations on a 3D graphical object where a fibrous structure is placed. In addition, a high-density point sampling technique can involve highly intensive computer processing or other use of computing resources. As an example, applying a high-density point sampling technique to generate fur on a 3D graphical object can require processing for billions of calculations to identify locations for millions of point samples across the 3D graphical object, at which the example fur structures are placed. In some cases, it is desirable for a high-density point sampling technique to utilize computing resources efficiently, such as by implementing improved use of processing resources to identify point sample locations on a 3D graphical object.

Delays related to displaying the 3D graphical object are generally undesirable, particularly in cases where a person interacts with the 3D graphical object via a user interface. For example, a user who is participating in a digital 3D graphical environment, such as a virtual reality environment, may desire to rapidly interact with the 3D graphical object without waiting for object loading or other types of delays. In addition, a graphics designer who creates 3D graphical objects may perform many design actions to create a particular fibrous surface for a 3D graphical object, such as dozens or hundreds of design actions to achieve a particular artistic appearance or other desired characteristic. For the example graphical environment user and graphics designer, generating the 3D graphical object can involve running a high-density point sampling technique to identify statistical placement of point sample locations on the 3D graphical object. The graphical environment user may expend time waiting on loading for the 3D graphical object. The graphics designer may expend time to run the high-density point sampling technique for each of the dozens or hundreds of design actions. In some cases, it is desirable for a high-density point sampling technique to run quickly, such as to reduce time expenditure or otherwise improve outcomes for a person who wishes to interact with a 3D graphical object.

SUMMARY

According to certain embodiments, a graphics generation computing device applies triangle-level rejection sampling to generate a set of surface mesh point samples. A highly parallelized processor included in the graphics generation computing device generates a triangle-level sampling array that includes triangle-level sampling data for each triangle included in a 3D object mesh. Based on the data included in the triangle-level sampling array, the highly parallelized processor determines a quantity of point samples included in each triangle. Additionally or alternatively the highly parallelized processor calculates, for each of the point samples, point sample location data that indicates a location of the point sample on a triangle associated with the point sample. The highly parallelized processor modifies a set of point samples to include the point sample location data. In some cases, the set of point samples is utilized by the graphics generation computing device or provided to an additional computing device, such as to generate digital fibers or other structure data objects at the point sample locations indicated by the set of point samples.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
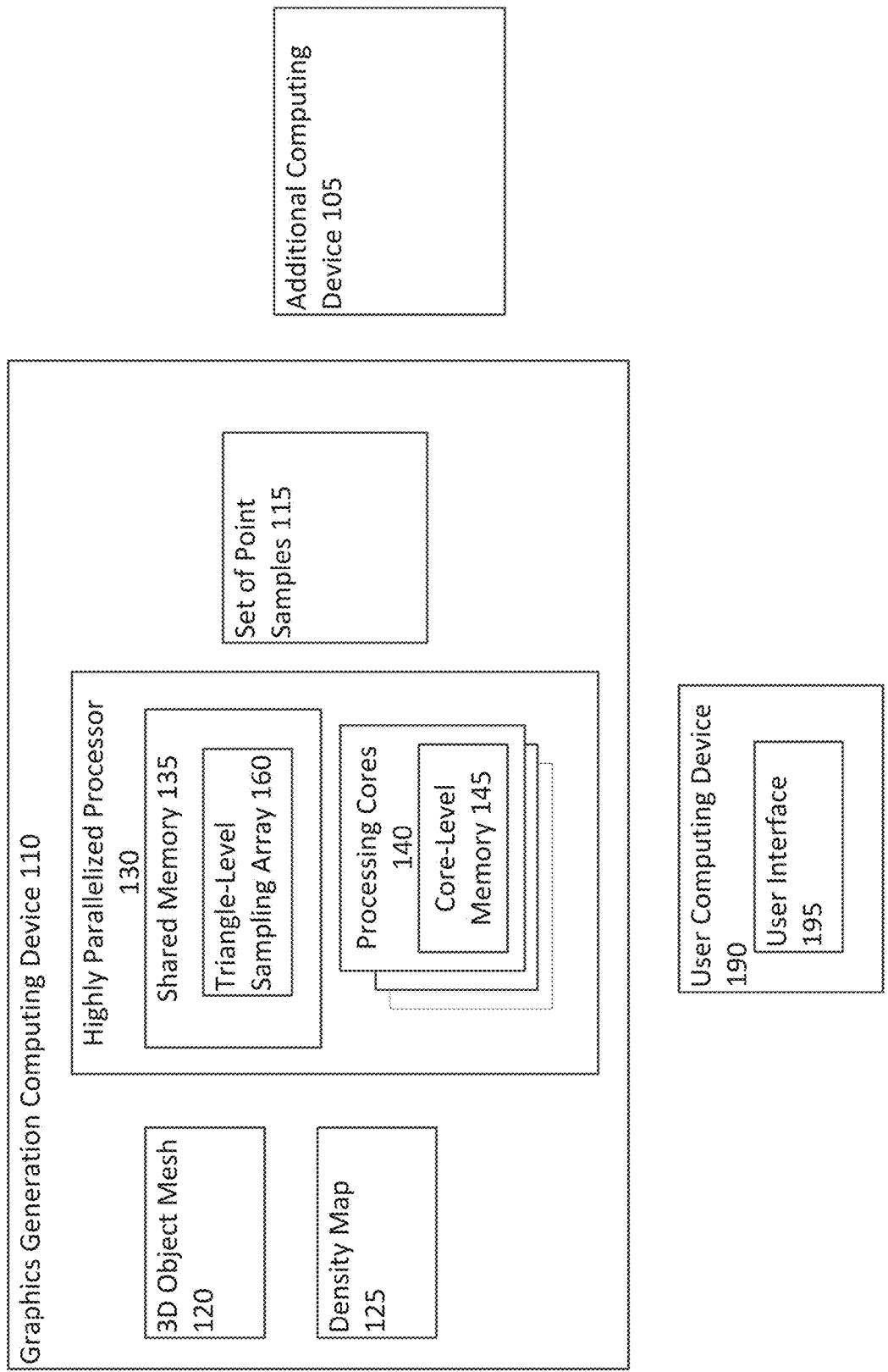
FIG. 1 is a diagram depicting an example of a graphics presentation computing environment in which 3D graphical objects are generated, according to certain embodiments.

As discussed above, prior techniques for high-density point sampling do not efficiently calculate point samples. In some cases, inefficient calculation of point samples causes delays for a user who is waiting on a 3D graphical object to be displayed, such as a designer of the graphical object or a user interacting with the graphical object in a 3D digital environment. In addition, inefficient calculation of point samples utilizes computing resources poorly, such as inefficient allocation of memory or processing resources. Contemporary techniques for high-density point sampling can include contemporary rejection sampling that is implemented over a mesh for a 3D graphical object without consideration of individual triangles in the mesh.

Certain embodiments described herein provide for triangle-level high-density point rejection sampling techniques ("triangle-level rejection sampling") that generates a set of point samples for a surface mesh with increased efficiency, as compared to contemporary rejection sampling. A graphics generation computing device that is configured to implement the described techniques for triangle-level rejection sampling can determine triangle-level sampling data for each triangle that is included in a surface mesh for a 3D graphical object. The example graphics generation computing device includes a highly parallelized processor with multiple processing cores (also referred to herein as "cores") that generate, in parallel, the triangle-level rejection sampling data for each triangle. In addition, the graphics generation computing device configured for triangle-level rejection sampling can generate one or more data structures to store the triangle-level sampling data, such as a triangle-level sampling array. In some cases, the multiple processing cores in the highly parallelized processor utilize the triangle-level sampling array to rapidly identify point samples that are included in the triangles of the mesh. In addition, the multiple processing cores in the highly parallelized processor generate, in parallel, point location data for each point sample that is identified in the triangle-level sampling array.

The following examples are provided to introduce certain embodiments of the present disclosure. A graphics generation computing device that is configured to implement techniques for triangle-level rejection sampling receives data objects, such as a 3D object mesh and a density map, that are related to a 3D graphical object. The 3D object mesh describes multiple triangles that are included in a surface of the 3D graphical object. The density mesh describes a grid of texture elements ("texels") indicating a statistical distribution of potential point sample locations on the surface of the 3D graphical object. The example graphics generation computing device includes at least one highly parallelized processor, such as a graphics processing unit ("GPU") or a central processing unit ("CPU"), that includes a large quantity of multiple processing cores (e.g., hundreds of cores, thousands of cores). In the highly parallelized processor, the multiple processing cores are capable of operating in parallel with and independently (or partially independently) of other cores in the highly parallelized processor, such as performing independent calculations on various data values or coordinating among cores to avoid duplicating calculations for a particular data value. The highly parallelized processor and the multiple processing cores are configured for high-capacity parallel processing, such as parallel processing of a very large quantity of data values (e.g., millions, billions of data values) that are related to the 3D graphical object. In the example graphics generation computing device, the highly parallelized processor determines a quantity of triangles included in the 3D object mesh (or a subset of the triangles). In addition, the highly parallelized processor generates a triangle-level sampling array that includes a record for each triangle included in the 3D object mesh (or the subset). The multiple processing cores calculate, in parallel, triangle-level sampling data for each of the triangles, including a maximum density value and a sampling quantity for each triangle. In addition, the multiple processing cores modify, in parallel, each record of the triangle-level sampling array based on the triangle-level sampling data. For example, each record in the triangle-level sampling array is modified to include the maximum density value for the associated triangle. In addition, each record in the triangle-level sampling array is modified to include a cumulative sampling quantity for the associated triangle. In the example graphics generation computing device, the cumulative sampling quantity for each triangle is a sum of the sampling quantity for the associated triangle and additional sampling quantities for additional triangles, e.g., a cumulative sum of sampling quantities based on previously modified records. In some cases, the example graphics generation computing device utilizes particular characteristics of the highly parallelized processor to increase accuracy of data in the modified triangle-level sampling array, such as using atomic instructions of the highly parallelized processor. An example of an atomic instruction is an instruction that can operate on data that is read or written by multiple cores without conflicts (e.g., multiple simultaneous or overlapping operations on a particular piece of data) among the multiple cores. For example, the multiple processing cores are configured to use the atomic instructions for conflict-free modification of the triangle-level sampling array, which can prevent inaccuracies that could result from multiple simultaneous modifications (e.g., conflicts) of multiple records by multiple cores. In some cases, the highly parallelized processor normalizes the cumulative sampling quantities in the records, such as normalizing the cumulative sampling quantity for each triangle.

Continuing with this example, the graphics generation computing device configured for triangle-level rejection sampling generates a set of point samples based on data included in the triangle-level sampling array. Based on the cumulative sampling quantities in the triangle-level sampling array (e.g. a greatest value for a cumulative sampling quantity, a cumulative sampling quantity in a record that modified subsequent to every other record), the graphics generation computing device determines a total quantity of point samples identified in the triangle-level sampling data. In addition, the highly parallelized processor (or another component of the graphics generation computing device) allocates a data structure to include the set of point samples. In some cases, allocating a point sample data structure based on the triangle-level sampling data reduces memory consumption as compared to a contemporary rejection sampling technique. For example, the set of point samples that is allocated based on the cumulative sampling quantities in the triangle-level sampling array is a smaller data structure including fewer point samples as compared to a contemporary point sample data structure allocated based on a maximum value for the density map, e.g., without determining portions of the density map that are uncorrelated with triangles from the 3D object mesh.

In the example graphics generation computing device configured for triangle-level rejection sampling, the multiple processing cores in the highly parallelized processor calculate, in parallel, location data for each point sample indicated by the triangle-level sampling array. A particular processing core calculates location data for a particular point sample based on data in the triangle-level sampling array, such as determining a triangle associated with the point sample based on the cumulative sampling quantity and calculating the location data based on the maximum density value for the triangle. In addition, the multiple processing cores modify, in parallel, the allocated set of point samples to include the calculated location data. In some cases, the allocated set of point samples is modified to include additional point sample data, such as data describing a structure data object identified for placement at a point sample location, data describing characteristics of the structure data object (e.g., color, length), or other types of point sample data. In some cases, the graphics generation computing device provides the set of point samples, including the location data, to one or more additional computing devices, such as additional computing systems or components within the graphics generation computing device that are configured to generate the 3D graphical object (or other 3D graphical data) based on the set of point samples.

Certain embodiments described herein provide improvements for graphics generation computing devices or rejection sampling techniques. For example, a graphics generation computing device configured for triangle-level rejection sampling, as described herein, generates location data or other point sample data based on one or more specialized data structures, such as a triangle-level sampling array that includes triangle-level sampling data. In addition, the graphics generation computing device configured for triangle-level rejection sampling generates location data or other point sample data by applying particular rules that identify relationships among data elements included in the triangle-level sampling array, such as relationships among data describing point samples, triangles, a range of a cumulative sampling quantity, a maximum density value, or other data values includes in the triangle-level sampling array. In some cases, the application of these rules by the graphics generation computing device configured for triangle-level rejection sampling achieves one or more improved technological results, such as improving efficient use of computing resources. For example, the graphics generation computing device configured for triangle-level rejection sampling can generate a set of point samples with reduced processing expenditure, such as by reducing or eliminating processing operations related to performing contemporary rejection sampling on point samples that are described by a density map but not located within a triangle of a 3D object mesh, or reducing or eliminating processing operations related to performing contemporary rejection sampling on triangles that do not include enough point samples to calculate point sample data. In addition, the set of point samples that is generated based on the described triangle-level rejection sampling techniques can have a reduced memory allocation as compared to a contemporary set of point samples that does not utilize triangle-level sampling data. In some cases, the graphics generation computing device configured for triangle-level rejection sampling improves the experience of humans who interact with a digital 3D graphical environment, such as by reducing wait time related to generating a 3D graphical object with fur or other fibrous digital structures.

Referring now to the drawings, FIG. 1 is an example of a computing environment in which 3D graphical objects are generated or modified, such as a graphics presentation computing environment 100. The graphics presentation computing environment 100 includes one or more computing devices configured for presentation of 3D graphical objects, such as a graphics generation computing device 110. In some cases, the graphics presentation computing environment 100 includes at least one user computing device, such as a user computing device 190, that is utilized by a person who desires to interact with 3D graphical objects, such as a graphics designer or a user participating in an interactive 3D graphical environment (e.g., a gaming environment, a virtual reality environment). The user computing device 190 includes a user interface 195, via which the user can provide inputs to or receive outputs from the graphics generation computing device 110. For example, via the user interface 195, a user, such as a graphics designer or 3D environment participant, could provide inputs that modify one or more 3D graphical objects that are generated via the graphics generation computing device 110. In addition, the graphics presentation computing environment 100 includes at least one additional computing device, such as an additional computing device 105, that is configured to utilize data that is received from the graphics generation computing device 110. In some cases, the additional computing device 105 is an additional computing system that is utilized by a user, such as the example graphics designer or 3D environment participant. Additionally or alternatively, the additional computing device 105 is an additional component of the graphics generation computing device 110, such as an additional processor (or group of processors) that is configured for graphics generation based on the data that is received from the graphics generation computing device 110. In some cases, the additional computing device 105 is configured for implementing a 3D graphical object based on data that is received from the graphics generation computing device 110, such as a user computing device that is configured to display the 3D graphical object within an interactive 3D graphical environment.

In some implementations, one or more of the graphics generation computing device 110, the user computing device 190, or the additional computing device 105 are capable of communicating via one or more computing networks, such as an local-area network or a wide-area network. In some implementations, one or more of the graphics generation computing device 110, the user computing device 190, or the additional computing device 105 are capable of communicating via one or more computing components, such as a data bus that is internal to the graphics generation computing device 110. FIG. 1 depicts the graphics generation computing device 110, the additional computing device 105, and the user computing device 190 as various computing devices included in the graphics presentation computing environment 100, but other implementations are possible. For example, a graphics generation computing device could include one or more additional computing components that are configured for graphics generation, or one or more user interface components by which a graphics designer could provide inputs to the example graphics generation computing device.

In the graphics presentation computing environment 100, the graphics generation computing device 110 is configured to perform a triangle-level high-density point rejection sampling technique ("triangle-level rejection sampling"). The graphics generation computing device 110 includes one or more highly parallelized processors, such as a highly parallelized processor 130, that are configured to perform triangle-level rejection sampling. In addition, the highly parallelized processor 130 includes a group of processing cores 140 that are configured to implement parallel processing of data that is received or generated by the highly parallelized processor 130. In some cases, each particular core of the processing cores 140 includes a respective memory component that is accessible by the particular core, such as a core-level memory 145 for each particular core of the processing cores 140. In addition, the highly parallelized processor 130 includes at least one shared memory location, such as a shared memory 135, that is accessible by each of the processing cores 140. An example of a highly parallelized processor is a graphics processing unit ("GPU"), but other types of processing units with high capacity for parallel processing (e.g., hundreds of processing cores, thousands of processing cores) can be utilized by a graphics generation computing device to implement triangle-level high-density point rejection sampling techniques. In the graphics generation computing device 110, the highly parallelized processor 130 and the processing cores 140 are hardware processing devices, with little or no virtualization of processing devices. However, other implementations are possible, such as a graphics generation computing device that includes a virtual highly parallelized processor or a hardware highly parallelized processor that utilizes virtual processing cores.

In some cases, the highly parallelized processor 130, the processing cores 140, and the shared memory 135 are configured for high-efficiency parallel processing. For example, the highly parallelized processor 130 can be configured with an instruction set that supports single instruction/multiple data ("SIMD") parallel processing, such as simultaneous (or nearly simultaneous) processing of multiple data values by respective cores of the processing cores 140. In some cases, the highly parallelized processor 130 can perform high-efficiency parallel processing via the SIMD instruction set (or other types of parallel instruction sets), such as by performing parallel processing of a very large quantity of data values (e.g., millions of data values) that are related to a 3D graphical object. In addition, the highly parallelized processor 130 can be configured with an instruction set that includes one or more atomic instructions, such as instructions that are implemented by a particular core of the processing cores 140 without conflicts by an additional core of the processing cores 140. In some cases, the highly parallelized processor 130 can perform high-efficiency parallel processing via the atomic instructions (or other types of conflict-free instructions), such as by performing a very large quantity of modifications to the shared memory 135 without interruption or delays caused by waiting on values (e.g., a particular core waiting on a value provided by another core).

In FIG. 1, the graphics generation computing device 110 receives one or more of a 3D object mesh 120 or a density map 125. In some cases, one or more of the 3D object mesh 120 or the density map 125 corresponds to a 3D graphical object that is presented in the graphics presentation computing environment 100. For example, the 3D object mesh 120 includes data describing a set of triangles, such as triangles that are included in a surface of the 3D graphical object. In some cases, the 3D object mesh 120 includes data indicating edges and vertices describing the triangles, positions of the triangles (e.g., relative to a graphical environment, relative to additional triangles of the set), surface normal vectors (e.g., perpendicular to triangle planes), or other types of data that describe the triangles of the 3D graphical object. In addition, the density map 125 includes data describing a statistical distribution of potential point sample locations on a surface of the 3D graphical object that is presented in the graphics presentation computing environment 100, such as a surface described by the 3D object mesh 120. For example, the density map 125 includes data describing a two-dimensional grid, each portion of the grid indicating a texture element ("texel") of the density map 125. In some cases, the density map 125 includes data indicating, for each particular texel, a respective density value that describes a density of potential point samples (e.g., potential to have a location value generated by the graphics generation computing device 110) that are within the particular texel. An example of density value data for a particular texel can include a numeric value equal to or greater than 0, wherein 0 indicates that zero point samples should be generated in the particular texel (e.g., the texel is mapped to a bare surface) and numbers greater than 0 indicate a proportional quantity of point samples that should be generated in the particular texel, but other implementations of density value data can be utilized.

In the graphics presentation computing environment 100, the graphics generation computing device 110 generates (or modifies) a set of point samples 115 by applying triangle-level rejection sampling to a combination of data values from the 3D object mesh 120 and the density map 125. The set of point samples 115 includes, for instance, point sample data that describes one or more surface mesh point samples, such as point samples that can have a location on a surface of the 3D object mesh 120. In some cases, the highly parallelized processor 130 generates or modifies the set of point samples 115 by performing triangle-level rejection sampling in parallel across multiple triangles, e.g., parallel triangle-level rejection sampling via the processing cores 140. For example, the graphics generation computing device 110 identifies a set of some or all triangles in the 3D object mesh 120. In addition, a group of some or all of the processing cores 140 calculates the set of point samples 115 for the identified set of triangles. In FIG. 1, the graphics generation computing device 110 is described as configuring all of the processing cores 140 to calculate point samples for all triangles included in the 3D object mesh 120, but other implementations are possible. As an example, a graphics generation computing device could apply triangle-level rejection sampling to calculate point samples for a subset of triangles, such as a subset of triangles included in a visible portion of a 3D graphical object (e.g., visible from a particular viewpoint in a digital graphical environment). As another example, a graphics generation computing device could configure a subset of processing cores to apply triangle-level rejection sampling to an example set of triangles, such as if the example set of triangles includes fewer triangles than a total quantity of processing cores in the example graphics generation computing device.

In FIG. 1, for each particular triangle in the set of triangles identified from the 3D object mesh 120, a particular core of the processing cores 140 calculates respective triangle-level sampling data for the particular triangle. In addition, the respective triangle-level sampling data calculated by the particular core includes one or more data values that can be utilized to determine respective point sample data for the particular triangle, such as one or more point sample locations that are included in the set of point samples 115. For example, the respective triangle-level sampling data can include data values that describe a bounding region for the particular triangle, such as a triangle bounding region that includes a subset of texels (e.g., from the density map 125) corresponding to the particular triangle. Additionally or alternatively, the respective triangle-level sampling data can include data values that describe one or more density values for the particular triangle, such as a triangle maximum density value that indicates a maximum likelihood of a point sample being located within the particular triangle, such as a likelihood that is based on a density of potential point samples described by the triangle maximum density value. Additionally or alternatively, the respective triangle-level sampling data can include data values that describe a sampling quantity for the particular triangle, such as a triangle sampling quantity that indicates a quantity of point samples included in the particular triangle.

In some cases, the particular core of the processing cores 140 stores the respective triangle-level sampling data in the respective core-level memory 145 included in the particular core. Additionally or alternatively, the particular core modifies at least a portion of the shared memory 135, such as a triangle-level sampling array 160, based on the respective triangle-level sampling data. For example, the particular core could modify a respective record (or other portion) of the triangle-level sampling array 160 to include the respective triangle-level sampling data. In the highly parallelized processor 130, the triangle-level sampling array 160 is stored in the shared memory 135. In FIG. 1, each particular core of the processing cores 140 modifies the triangle-level sampling array 160 based on the respective triangle-level sampling data calculated by the particular core. In addition, each particular core of the processing cores 140 modifies the triangle-level sampling array 160 to include a data value describing a cumulative sampling quantity that is associated with the set of triangles identified from the 3D object mesh 120. For example, each particular core of the processing cores 140 modifies the cumulative sampling quantity to indicate a sum or other combination of triangle sampling quantities for multiple triangles in the set. In the highly parallelized processor 130, each particular core modifies the triangle-level sampling array 160, such as calculating the cumulative sampling quantity, via one or more atomic instructions. In some cases, the modifications by the particular core via the atomic instructions are protected from conflicts (e.g., overlapping modifications) by another core of the processing cores 140 during the atomic instructions. For example, a first core that is calculating first triangle-level sampling data for a first triangle may utilize an atomic instruction to calculate a first value for the cumulative sampling quantity. In addition, the first core modifies the triangle-level sampling array 160 based on the first value for the cumulative sampling quantity. In this example, by utilizing the atomic instruction, the one or more operations by the first core, such as calculation of the first value or modification to the triangle-level sampling array 160, are is conflict-free, such that a second core calculating second triangle-level sampling data for a second triangle cannot interrupt or otherwise cause a conflict for the first modification performed by the first core. In some cases, a graphics generation computing device that is configured to perform triangle-level rejection sampling using atomic instructions can generate or modify a set of point samples with improved efficiency or accuracy, compared to generating a set of point samples via contemporary point sampling techniques. For example, the graphics generation computing device 110 can use atomic instructions to efficiently perform triangle-level rejection sampling for generating the set of point samples 115, such as by reducing or eliminating delays resulting from a particular core waiting on a data value from another core. In addition, the graphics generation computing device 110 can use atomic instructions to accurately perform triangle-level rejection sampling for generating the set of point samples 115, such as by reducing or eliminating inaccuracies that could result from multiple cores attempting to simultaneously (e.g., during a non-atomic instruction) modify the cumulative sampling quantity or other data included in the triangle-level sampling array 160.

In some implementations, the graphics generation computing device 110 calculates one or more normalized values of the cumulative sampling quantity indicated by the triangle-level sampling array 160. For example, the highly parallelized processor 130 calculates, for each particular record (or other portion) of the triangle-level sampling array 160, a respective normalized triangle sampling quantity. In addition, the highly parallelized processor 130 modifies the triangle-level sampling array 160 based on the normalized triangle sampling quantity, such as by modifying each particular record to include a respective normalized cumulative sampling quantity that is based on the normalized triangle sampling quantity for the record. In some cases, the graphics generation computing device 110 is configured to normalize the cumulative sampling quantity indicated by the triangle-level sampling array 160 based on an input, such as an input indicating a criteria for memory usage (or other computing resource usage), an input indicating a modification of the 3D graphical object being presented (e.g., from the user computing device 190), or another type of input indicating normalization of the cumulative sampling quantity indicated by the triangle-level sampling array 160.

In the graphics presentation computing environment 100, the graphics generation computing device 110 generates (or modifies) the set of point samples 115 via triangle-level rejection sampling, based on the triangle-level sampling data included in the triangle-level sampling array 160. In some cases, the highly parallelized processor 130 generates or modifies the set of point samples 115 by performing triangle-level rejection sampling in parallel, e.g., via the processing cores 140, across multiple point samples that are indicated by the cumulative sampling quantity in the triangle-level sampling array 160. For example, each processing core in the processing cores 140 identifies, based on the cumulative sampling quantity, a particular point sample that is associated with a particular triangle from the set of triangles identified from the 3D object mesh 120. In addition, each processing core in the processing cores 140 calculates, for the particular point sample, a respective location of the particular point sample within the particular triangle. In some cases, each processing core in the processing cores 140 modifies the set of point samples 115 to include the point sample location calculated for the particular point sample. In the highly parallelized processor 130, a particular processing core of the processing cores 140 might or might not calculate triangle-level sampling data for a particular triangle and also calculate a location of a point sample included in the particular triangle. For example, if a first processing core calculates first triangle-level sampling data for a first triangle, the first processing core might calculate none, some, or all point sample locations for point samples included in the first triangle.

In FIG. 1, the graphics generation computing device 110 is described as configuring all of the processing cores 140 to calculate locations for all point samples indicated by the triangle-level sampling array 160, but other implementations are possible. As an example, a graphics generation computing device could apply triangle-level rejection sampling to calculate point sample locations for a subset of point samples, such as a normalized quantity of point samples or a subset of point samples included in triangles for a visible portion of a 3D graphical object. As another example, a graphics generation computing device could configure a subset of processing cores to apply triangle-level rejection sampling to an example set of point samples, such as if the example set of point samples includes fewer point samples than a total quantity of processing cores in the example graphics generation computing device.

In the graphics generation computing device 110, for each particular point sample identified by the cumulative sampling quantity (or normalized cumulative sampling quantity) in the triangle-level sampling array 160, a particular processing core of the processing cores 140 calculates respective point sample data for the particular point sample. In addition, the particular processing core calculates the respective point sample data based on respective triangle-level sampling data that includes the particular point sample. For example, based on the triangle-level sampling data included in the triangle-level sampling array 160, the particular processing core identifies a relationship between the particular point sample and a particular triangle that includes the particular point sample. In addition, based on the relationship identified by the triangle-level sampling data, the particular processing core generates the respective point sample data, such as by calculating a location of the particular point sample within the particular triangle. Examples of point sample data for a point sample can include a point sample location (e.g., a location within a triangle associated with the point sample), a structure data object indicating a fibrous structure (e.g., grass, fur) or other type of digital structure that is identified for placement at the point sample, structural data indicating characteristics of the structure data object (e.g., color, length), or other types of data associated with a point sample.

In some cases, a graphics generation computing device that is configured to perform triangle-level rejection sampling based on data included in a triangle-level sampling array can generate or modify a set of point samples with improved efficiency, compared to generating a set of point samples via contemporary point sampling techniques. For example, the graphics generation computing device 110 uses the triangle-level sampling array 160 to efficiently generate or modify the set of point samples 115, such as by rapidly identifying relationships between point samples and triangles that include the point samples. In some cases, the graphics generation computing device 110 uses the triangle-level sampling array 160 to efficiently reject one or more point samples from the set of point samples 115, such as by identifying, via the triangle-level sampling data, one or more triangles that do not include enough (e.g., exceeding a threshold quantity) point samples to calculate point sample data. In some cases, the graphics generation computing device 110 uses the triangle-level sampling array 160 to improve efficient use of computing resources as compared to contemporary point sampling techniques, such as by reducing or eliminating processing operations or memory usage related to performing contemporary rejection sampling on triangles that do not include enough point samples to calculate point sample data.

In the graphics presentation computing environment 100, the graphics generation computing device 110 provides the set of point samples 115 to one or more additional computing devices, such as the additional computing device 105. In some cases, the additional computing device 105 is configured for implementing one or more additional graphical generation techniques based on the set of point samples 115. For example, the additional computing device 105 can generate digital structures based on the point sample data in the set of point samples 115, such as identifying a digital structure indicated by a structure data object, generating the digital structure at one or more point sample locations, or performing other graphical generation techniques based on the point sample data in the set of point samples 115.

In some implementations, a graphics generation computing device that is configured for triangle-level rejection sampling includes a highly parallelized processor that is configured for parallel calculation of a cumulative sampling quantity of point samples. In some cases, the highly parallelized processor is configured to apply, via triangle-level rejection sampling, parallel operations to calculate multiple portions of the cumulative sampling quantity simultaneously (e.g., during a particular set of parallel instructions). Additionally or alternatively, the highly parallelized processor is configured to output one or more data structures, such as a triangle-level sampling array, that indicate the multiple portions of the cumulative sampling quantity at a triangle level. In some cases, the triangle-level sampling array (or other data structure) is arranged to indicate a relationship among a particular triangle from a 3D object mesh, a particular point sample that is included in the particular triangle, and a particular range or other portion of the cumulative sampling quantity that includes the particular point sample.

Figure 2:
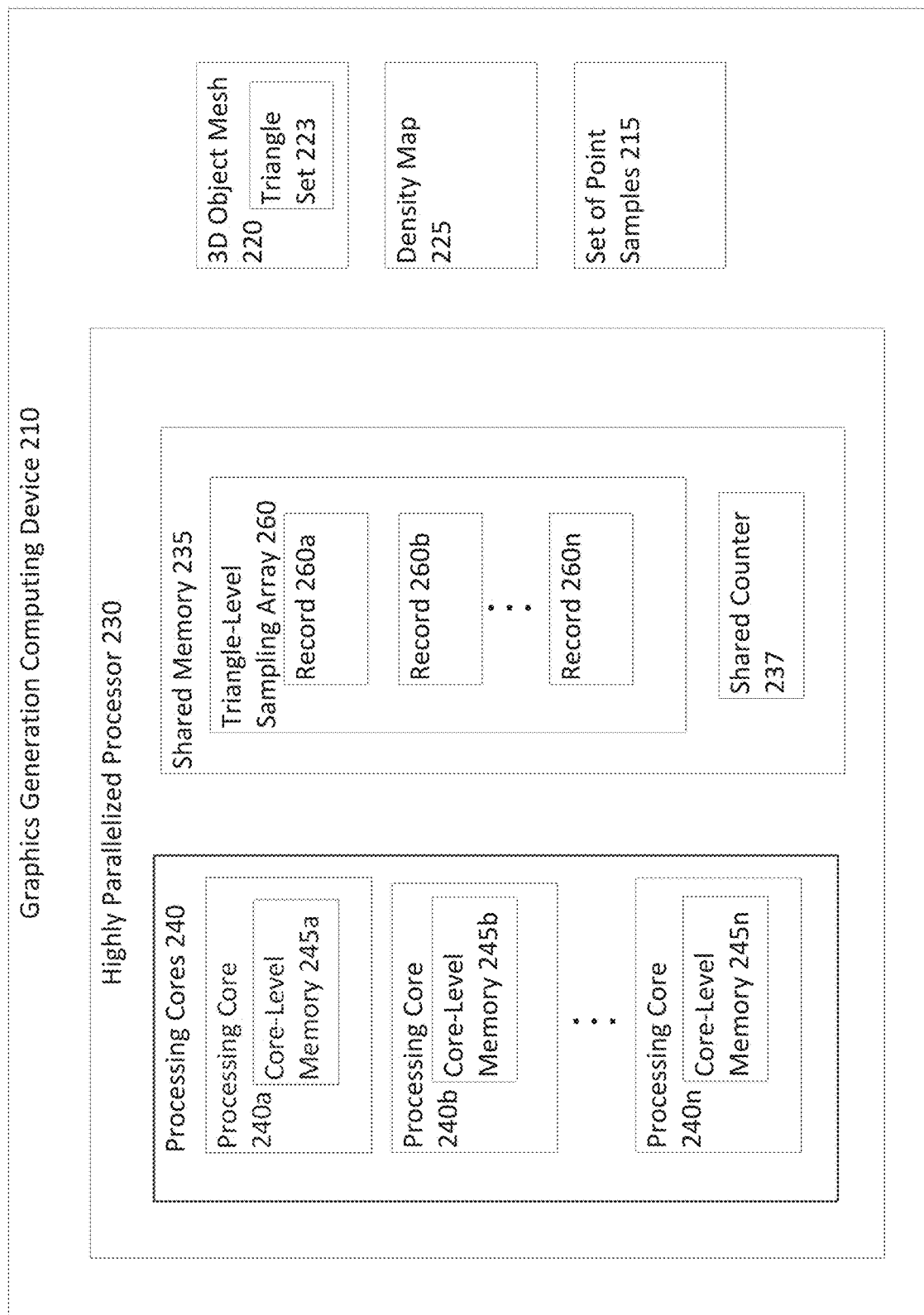
FIG. 2 is a diagram depicting an example of a graphics generation computing device configured to perform triangle-level rejection sampling, according to certain embodiments.
Figure 3:
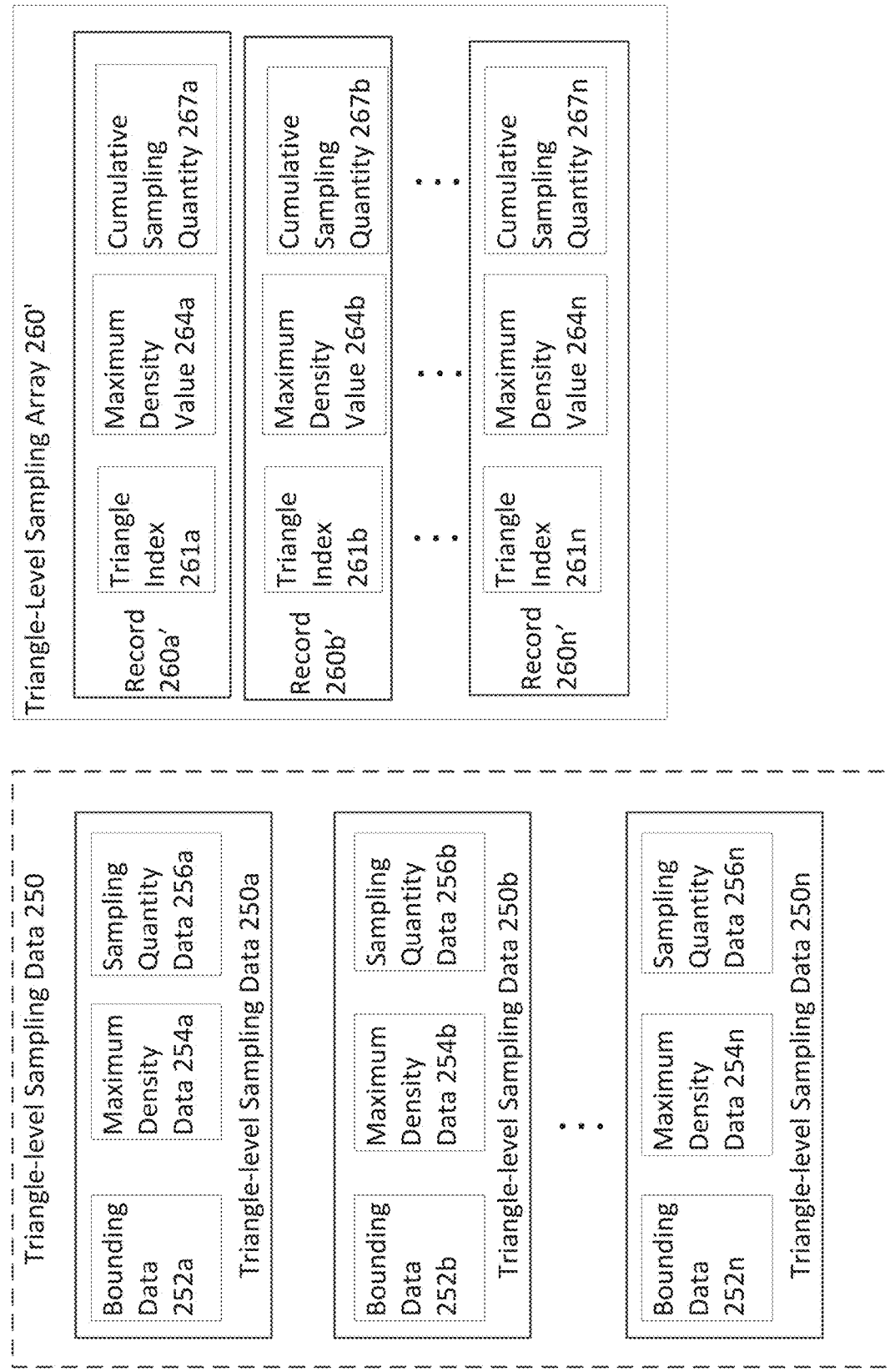
FIG. 3 includes diagrams depicting an example of a triangle-level sampling array generated or modified by a graphics generation computing device, according to certain embodiments.

FIG. 2 depicts an example of a graphics generation computing device 210 that is configured to perform triangle-level rejection sampling. In addition, the graphics generation computing device 210 is configured to generate (or modify) one or more data structures, such as a triangle-level sampling array 260, that include triangle-level sampling data utilized during the triangle-level rejection sampling performed by the graphics generation computing device 210. FIG. 3 includes diagrams depicting some examples of data structures generated or modified by the graphics generation computing device 210, such as a triangle-level sampling array 260' that includes one or more particular records that are included in the triangle-level sampling array 260. For convenience, FIG. 3 depicts the examples of data structures in a human readable format, but other implementations of data structures are possible, including data structures that are not intended for human interpretation. In some cases, one or more data structures generated or modified by the graphics generation computing device 210 can include very large quantities of data values, such as a triangle-level sampling array that includes millions or billions of data values or data records related to millions or billions of triangles, point samples, or other data values related to 3D graphical objects.

In FIG. 2, the graphics generation computing device 210 includes one or more highly parallelized processors, such as a highly parallelized processor 230, that are configured to perform triangle-level rejection sampling. In some cases, the graphics generation computing device 210 is included in a graphics presentation computing environment, such as the graphics presentation computing environment 100 described in regard to FIG. 1. In some cases, the graphics generation computing device 210 is included in a computing environment configured to provide 3D graphical objects to one or more additional computing devices, such as a computing environment configured to provide a 3D graphical environment (e.g., a gaming environment, a virtual reality environment).

In the graphics generation computing device 210, the highly parallelized processor 230 includes a group of processing cores 240 that are configured to implement parallel processing of data that is received or generated by the highly parallelized processor 230. In addition, the highly parallelized processor 230 includes at least one shared memory location, such as a shared memory 235, that is accessible by each of the processing cores 240. In the highly parallelized processor 230, the group of processing cores 240 includes a first processing core 240a, a second processing core 240b, and additional processing cores including an nth processing core 240n. In the highly parallelized processor 230, each core in the processing cores 240 includes a respective core-level memory. For example, the first processing core 240a includes a first core-level memory 245a, the second processing core 240b includes a second core-level memory 245b, and additional core-level memories for each additional processing core through the nth processing core 240n which includes a core-level memory 245n. In the highly parallelized processor 230, each of the processing cores 240 is configured to access its respective core-level memory. In some cases, the highly parallelized processor 230 is configured to deny access, by a particular core, to the core-level memory for another core. For example, the first processing core 240a is configured to access the first core-level memory 245a, and the highly parallelized processor 230 is configured to deny access by the first processing core 240a to the core-level memories 245b through 245n. In some implementations, the highly parallelized processor 230 (or another highly parallelized processor include in the graphics generation computing device 210) can include a relatively large quantity of processor cores, such as several hundred or thousand processor cores each having a respective core-level memory.

In the graphics generation computing device 210, the highly parallelized processor 230, the processing cores 240, and the shared memory 235 are configured for high-efficiency parallel processing. For example, the highly parallelized processor 230 can be configured with a SIMD instruction set or another type of parallel instruction set that supports parallel processing, such as simultaneous (or nearly simultaneous) processing of multiple data values by respective cores of the processing cores 240. In some cases, the highly parallelized processor 230 can perform high-efficiency parallel processing via the SIMD or other parallel instruction set, such as by performing parallel processing of a very large quantity of data values (e.g., millions of data values) that are related to a 3D graphical object. In addition, the highly parallelized processor 230 can be configured with an instruction set that includes one or more atomic instructions, such as instructions that are implemented by a particular core of the processing cores 240 without conflict by an additional core of the processing cores 240. In some cases, the highly parallelized processor 230 can perform high-efficiency parallel processing via the atomic or other conflict-free instructions, such as by performing a very large quantity of modifications (e.g., millions of modifications related to millions of triangles in the 3D graphical object) to the shared memory 235 without conflicts or delays caused by waiting on values (e.g., a particular core waiting on a value provided by another core).

In FIG. 2, the graphics generation computing device 210 receives or otherwise accesses one or more of a 3D object mesh 220 or a density map 225. In some cases, one or more of the 3D object mesh 220 or the density map 225 correspond to a 3D graphical object, such as the 3D graphical object being presented in the graphics presentation computing environment 100 as described in regard to FIG. 1. In FIG. 2, the 3D object mesh 220 includes data describing a set of triangles 223 that are included in a surface of the 3D graphical object. In addition, the density map 225 includes data describing a statistical distribution of potential point sample locations on the surface described by the 3D object mesh 220. The graphics generation computing device 210 generates or modifies a set of point samples 215, such as by applying triangle-level rejection sampling to a combination of data values from the 3D object mesh 220 and the density map 225. In some cases, the set of point samples 215 describes one or more surface mesh point samples, such as a point sample having a location on a surface of a tringle described by the 3D object mesh 220. In some cases, the highly parallelized processor 230 generates or modifies one or more data values in the set of point samples 215 by performing triangle-level rejection sampling in parallel, e.g., via the processing cores 240. For example, the highly parallelized processor 230 performs triangle-level rejection sampling in parallel across multiple triangles and multiple point samples that are determined based on a combination of the 3D object mesh 220 and the density map 225. In some implementations, the highly parallelized processor 230 allocates a data structure of the set of point samples 215 based on a quantity of point samples identified by the triangle-level rejection sampling performed in parallel across the multiple triangles. In some cases, allocating a point sample data structure, such as the set of point samples 215, based on triangle-level rejection sampling can improve usage of memory resources in a graphics generation computing device. For example, allocating a data structure to describe an identified quantity of point samples (e.g., identified via triangle-level rejection sampling) can use fewer memory resources as compared to allocating a data structure for all potential point samples in a contemporary rejection sampling technique that does not evaluate point samples at a triangle level. In FIG. 2, the graphics generation computing device 210 is described as configuring all of the processing cores 240 to calculate data for all triangles included in the triangle set 223, but other implementations are possible, such as configuring a portion of the processing cores 240 to calculate data for a portion of the triangles included in the triangle set 223.

In the graphics generation computing device 210, a particular core of the processing cores 240 calculates respective triangle-level sampling data for each particular triangle in the triangle set 223. In FIG. 3, triangle-level sampling data 250 includes the respective triangle-level sampling data calculated by each of the processing cores 240, including first triangle-level sampling data 250a, second triangle-level sampling data 250b, and nth triangle-level sampling data 250n. For example, the first processing core 240a receives data describing a first triangle from the triangle set 223. Based on the data describing the first triangle, the first processing core 240a generates one or more data values that are included in the first triangle-level sampling data 250a that is associated with the first triangle. For example, the first processing core 240a generates bounding data 252a that describes a triangle bounding region for the first triangle, such as by determining a subset of texels in the density map 225 that correspond to area data for the first triangle. Additionally or alternatively, the first processing core 240a determines, e.g., from the density map 225, one or more triangle density values that are associated with the first triangle, such as a respective density value for each texel indicated by the bounding data 252a. In some cases, the first processing core 240a generates maximum density data 254a based on a triangle maximum density value from the density values for the first triangle. For example, the first processing core 240a identifies at least one texel associated with the first triangle (e.g., in the bounding data 252a) having a density value that is a maximum (or otherwise fulfills one or more criteria) as compared to additional density values for additional texels associated with the first triangle. In some cases, the maximum density data 254a indicates a maximum value of the density map 225 for the first triangle, such as a maximum value of the distribution of potential point sample locations within the first triangle. Additionally or alternatively, the first processing core 240a generates triangle sampling quantity data 256a that describes a quantity of point samples included in the first triangle. For example, the first processing core 240a calculates, for one or more texels in the bounding data 252a, a respective statistical quantity (e.g., based on a statistical distribution for each particular texel) of point samples that are included in the texel. In addition, the first processing core 240a calculates a value of the triangle sampling quantity data 256a based on a sum, integral, or other combination of the respective statistical quantities of point samples for the texels in the bounding data 252a. In some cases, the first processing core 240a calculates the value of the triangle sampling quantity data 256a based on respective weights for one or more of the texels in the bounding data 252a. For example, the first processing core 240a determines respective weights for one or more texels that are partially included in the bounding data 252a, e.g., area data of the particular triangle indicates that a portion of a particular texel is located within the area of the triangle and another portion of the particular texel is located outside of the area of the triangle. In addition, the first processing core 240a calculates the triangle sampling quantity data 256a based on a texel-weighted combination of the area data with the subset of texels in the bounding data 252a, such as a combination that weights the statistical distributions for each texel included in the area data based on a proportion (or other weight) of the texel that is included in the area data.

In the highly parallelized processor 230, the first processing core 240a modifies the triangle-level sampling data 250a within the core-level memory 245a. The triangle-level sampling data 250a includes one or more of the bounding data 252a, the maximum density data 254a, or the triangle sampling quantity data 256a. In addition, one or more of the processing cores 240b through 240n can respectively calculate additional portions of the triangle-level sampling data 250 for additional triangles from the triangle set 223. For example, the second processing core 240b calculates, for a second triangle from the triangle set 223, the triangle-level sampling data 250b that includes bounding data 252b, maximum density data 254b or one or more additional triangle density values that are associated with the second triangle, and sampling quantity data 256b. Further, the nth processing core 240n calculates, for an nth triangle from the triangle set 223, the triangle-level sampling data 250n that includes bounding data 252n, maximum density data 254n or one or more additional triangle density values that are associated with the nth triangle, and sampling quantity data 256n. In some cases, the processing cores 240a through 240n calculate the respective portions of the triangle-level sampling data 250 in parallel, such as by storing values in the respective core-level memories 245a through 245n.

In FIG. 2, the processing cores 240 modify the triangle-level sampling array 260 or other portions of the shared memory 235 based on the respective portions of the triangle-level sampling data 250. For example, the shared memory 235 includes the triangle-level sampling array 260 and a shared counter 237 data value. In addition, the triangle-level sampling array 260 includes a record 260a, a record 260b, and additional records including an nth record 260n. FIG. 3 depicts the modified triangle-level sampling array 260' that is an example of modifications to the triangle-level sampling array 260. In addition, the modified triangle-level sampling array 260' includes a record 260a' that is an example modification of the record 260a, a record 260b' that is an example modification of the record 260b, a record 260n' that is an example modification of the record 260n, and additional records that are example modifications of the additional records in the triangle-level sampling array 260. In the graphics generation computing device 210, a quantity of the records 260a through 260n (or 260a' through 260n') has a same value as a quantity of the triangles in the triangle set 223. For example, the highly parallelized processor 230 can allocate the triangle-level sampling array 260 as an array data object that has one record per triangle in the triangle set 223. In the highly parallelized processor 230, each of the processing cores 240a through 240n modifies the shared counter 237 and at least one respective record of the records 260a through 260n. In some cases, such as if the triangle-level sampling array 260 has quantity of records that is larger than a quantity of the processing cores 240 (e.g., the triangle set 223 has more triangles that there are processing cores 240), one or more of the processing cores 240 modifies multiple records of the records 260a through 260n. In some cases, the processing cores 240 modify the shared counter 237 or the triangle-level sampling array 260 in an undefined order, e.g., an order that is unspecified by the highly parallelized processor 230. For convenience, FIGS. 2 and 3 depict the records 260a through 260n and 260a' through 260n' in an alphabetical order, but records included in a triangle-level sampling array need not have an order that is correlated to a group of processing cores in a highly parallelized processor. For example, if the second processing core 240b completes calculation of the second triangle-level sampling data 250b prior to the first processing core 240a completing calculation of the first triangle-level sampling data 250a, the second processing core 240b can modify a respective record of the triangle-level sampling array 260 prior to first processing core 240a modifying an additional record of the triangle-level sampling array 260. Continuing with this example, if the second processing core 240b completes further calculation of further triangle-level sampling data prior to the first processing core 240a completing calculation of the first triangle-level sampling data 250a, the second processing core 240b can modify a further record of the triangle-level sampling array 260 prior to first processing core 240a modifying the additional record of the triangle-level sampling array 260.

In the graphics generation computing device 210, one or more of the shared counter 237, the triangle-level sampling array 260, or the example modified triangle-level sampling array 260' is included in the shared memory 235. In addition, each of the processing cores 240 respectively modifies the shared counter 237 and a particular portion of the triangle-level sampling array 260 (or 260'), such as a respective modification via an atomic instruction. For example, the first processing core 240a generates (e.g., within the core-level memory 245a) a first modification data value that includes the sampling quantity data 256a. In addition, the second processing core 240b generates a second modification data value that includes the sampling quantity data 256b, and the nth processing core 240n generates an nth modification data value that includes the sampling quantity data 256n. In some cases, one or more of the modification data values also includes an increment value, such as an increment of value 1 (or another suitable value). In some cases, the processing cores 240 generate the modification data values as respective combinations of the sampling quantity data and the increment value, such as a first combination of the sampling quantity data 256a with the increment value, a second combination of the sampling quantity data 256b with the increment value, through an nth combination of the sampling quantity data 256n with the increment value. An example of a combination modification data value is a 64-bit integer that includes a concatenation of a sampling quantity data value in a first 32-bit portion and an increment value in a second 3-bit portion, but other implementations of a combination modification data value can be used.

In the highly parallelized processor 230, the first processing core 240a modifies one or more of the shared counter 237 or the triangle-level sampling array 260 based on the first modification data value. In some cases, the first processing core 240a modifies a first portion of the triangle-level sampling array 260, such as the record 260a', based on the first modification data value. For example, the first processing core 240a performs an instruction to sum (or otherwise combine) the first modification data value with a value of the shared counter 237. In some cases, the value of the shared counter 237 is a combination (e.g., sum) of one or more additional modification data values calculated by additional cores of the processing cores 240. values from an additional record (or other portion) of the triangle-level sampling array 260. In some cases, the instruction to combine the first modification data value with the value of the shared counter 237 is an atomic instruction, such as an AtomicAdd instruction included in a parallel instruction set of the highly parallelized processor 230. Additionally or alternatively, the atomic instruction improves efficiency of the modification to one or more of the shared counter 237 or the triangle-level sampling array 260, such as by preventing conflicts, by additional cores in the processing cores 240, for the modification performed by first processing core 240a. In addition, the second processing core 240b modifies the shared counter 237 based on the second modification data value, such as by performing the instruction to sum (or otherwise combine) the second modification data value with the value (or modified value) of the shared counter 237. Further, the nth processing core 240n modifies the shared counter 237 based on the nth modification data value, such as by performing the instruction to sum (or otherwise combine) the nth modification data value with the value (or modified value) of the shared counter 237. In some cases, the processing cores 240 modify the shared counter 237 in an undefined order, e.g., an order that is unspecified by the highly parallelized processor 230. Additionally or alternatively, the atomic instruction improves accuracy of the modification to the shared counter 237, such as by preventing conflicts among multiple modifications performed in an undefined order by multiple cores of the processing cores 240.

In the highly parallelized processor 230, the first processing core 240a modifies the record 260a' based on the modified value of the shared counter 237, such as based on a value (e.g., received by the first processing core 240a responsive to the atomic instruction performed by the core 240a) indicating the sum (or other combination) of the first modification data value with the one or more additional values included in the shared counter 237. For example, based on a sum of the increment value from the first modification data value with a record index indicating a particular record previously modified, one or more of the first processing core 240a or the highly parallelized processor 230 identifies the record 260a' for modification (e.g., having a record index equal to the sum of the increment value with the previous record index). In the identified record 260a', the first processing core 240a modifies a triangle index 261a to include a data value, such as a processing thread identification value, that identifies or otherwise indicates the first triangle associated with the triangle-level sampling data 250a. In addition, the first processing core 240a modifies a cumulative sampling quantity 267a in the record 260a' to include a sum of the sampling quantity data 256a with an additional cumulative sampling quantity data value from an additional record in the triangle-level sampling array 260'. In addition, the first processing core 240a modifies a triangle-level maximum density value 264a in the record 260a to include a data value of the maximum density data 254a. In some cases, the triangle-level maximum density value 264a is modified via the instruction, e.g., an atomic instruction, by which the triangle index 261a and the cumulative sampling quantity 267a are modified. In some cases, the triangle-level maximum density value 264a is modified via one or more additional instructions performed by the first processing core 240a. In the graphics generation computing device 210, the cumulative sampling quantity 267a indicates a cumulative sum (or other combination) of the sampling quantity data 256a with additional triangle-level sampling quantity data calculated and included in the shared counter 237 or the triangle-level sampling array 260' prior to the modification performed by first processing core 240a.

In addition, the second processing core 240b modifies a second portion of the triangle-level sampling array 260, such as the record 260b', based on the modified value of the shared counter 237, e.g., modified via the atomic instruction performed by the second processing core 240b. For example, based on a value (e.g., received by the second processing core 240b responsive to the atomic instruction performed by the core 240b) indicating the sum (or other combination) of the second modification data value with additional values included in the shared counter 237, the second processing core 240b modifies the record 260b' to include a triangle index 261b, a maximum density value 264b, and a cumulative sampling quantity 267b. Further, the nth processing core 240n modifies an nth portion of the triangle-level sampling array 260, such as the record 260n', based on the modified value of the shared counter 237, e.g., modified via the atomic instruction performed by the nth processing core 240n. For example, based on a value (e.g., received by the nth processing core 240n responsive to the atomic instruction performed by the core 240n) indicating the sum (or other combination) of the nth modification data value with additional values included in the shared counter 237, the nth processing core 240n modifies the record 260n' to include a triangle index 261n, a maximum density value 264n, and a cumulative sampling quantity 267n. In some cases, the cumulative sampling quantities 267a through 267n are calculated (or otherwise modified) in an undefined order, e.g., an order that is unspecified by the highly parallelized processor 230. In some cases, the cumulative sampling quantity of a particular record in the triangle-level sampling array 260' that is modified last (which might or might not be the record 260n') is a cumulative quantity of point samples for all triangles in the triangle set 223. In some cases, the cumulative sampling quantities 267a through 267n are triangle-level sampling data respectively associated with the first triangle through the nth triangle, such as portions of the triangle-level sampling data 250 that are respectively included in the records 260a' through 260n'.

As an example of possible numerical values for records in the triangle-level sampling array 260', the triangle-level sampling array 260' could include twenty modified records, e.g., twenty modifications have been made by one or more of the processing cores 240. In addition, the record 260b' could be the most recently modified record (e.g., the twentieth) and the cumulative sampling quantity 267b can have a numerical value of 200, indicating a cumulative quantity 200 of point samples for the twenty triangles associated with the twenty modified records (e.g., including the second triangle). In this example, the first processing core 240a modifies the triangle-level sampling array 260' subsequent to the modification of the record 260b' by the second processing core 240b. The first processing core 240a identifies the record 260a' based on a sum of the record index having a value of 20 (e.g., indicating twenty previously modified records) and the increment having a value of 1. In addition, the first processing core 240a modifies the cumulative sampling quantity 267a based on the sampling quantity data 256a. In this example, if the sampling quantity data 256a has a value of 15 (e.g., for the first triangle) and the cumulative sampling quantity 267b has a value of 200 (e.g., for the second triangle and any additional previously calculated triangles), the cumulative sampling quantity 267a is modified to have a value of 215 (e.g., 200+15). In this example, the first processing core 240a also modifies the maximum density value 264a to have the value of the maximum density data 254a and also modifies the triangle index 261*a* to have a value identifying the first triangle, such as a processing thread identification value that is associated with the first triangle.

Continuing with this example, the nth processing core 240*n* modifies the triangle-level sampling array 260' subsequent to the modification by the first processing core 240*a*. The nth processing core 240*n* identifies the record 260*n'* based on a sum of the record index having a value of 21 (e.g., as modified by the core 240*a*) and the increment having a value of 1. In addition, the nth processing core 240*n* modifies the cumulative sampling quantity 267*n* based on the sampling quantity data 256*n*. In this example, if the sampling quantity data 256*n* has a value of 3 (e.g., for the nth triangle) and the cumulative sampling quantity 267*a* has a value of 215 (e.g., for the first triangle, the second triangle, and any additional previously calculated triangles), the cumulative sampling quantity 267*n* is modified to have a value of 218 (e.g., 215+3). In this example, the nth processing core 240*n* also modifies the maximum density value 264*n* to have the value of the maximum density data 254*n* and also modifies the triangle index 261*n* to have a value identifying the nth triangle, such as a processing thread identification value that is associated with the nth triangle.

In some implementations, the graphics generation computing device 210 calculates one or more normalized values of the cumulative sampling quantities indicated by the triangle-level sampling array 260 (or 260'). For example, the highly parallelized processor 230 calculates, for each particular record of the triangle-level sampling array 260, a respective normalized triangle sampling quantity. In some cases, a particular core of the processing cores 240 calculates respective normalized triangle-level sampling data for each particular triangle indicated in the triangle-level sampling array 260 (e.g., each triangle in the triangle set 223). In addition, the highly parallelized processor 230 modifies the triangle-level sampling array 260 based on the normalized triangle sampling quantity, such as by modifying each particular record to include a respective normalized cumulative sampling quantity that is based on the normalized triangle sampling quantity for the record. For example, if the graphics generation computing device 210 receives an input indicating that each triangle in the triangle set 223 should have a quantity of point samples equal or less than a threshold sample quantity, the highly parallelized processor 230 can modify the triangle-level sampling array 260 such that, for each record, a cumulative sampling quantity range (e.g., a difference between the cumulative sampling quantity for the record and an additional cumulative sampling quantity for a previously modified record) is less than or equal to the threshold sample quantity. In this example, if the threshold sample quantity has a value of 500 (e.g., each triangle in the triangle set 223 should have 500 or fewer point samples) and the largest cumulative sampling quantity in the triangle-level sampling array 260 (e.g., for a particular record that is modified last) is 1000, the highly parallelized processor 230 can modify all cumulative sampling quantities in the triangle-level sampling array 260 to have a value that is reduced by 50%, such that the largest cumulative sampling quantity is 500 and each additional cumulative sampling quantity (e.g., for each additional record modified prior to the particular record) is less than 500. Based on the above example numerical values of 200, 215, and 218 for the cumulative sampling quantities 267*b*, 267*a*, and 267*n*, the highly parallelized processor 230 can modify the cumulative sampling quantity 267*b* to have a normalized value of 100 (e.g., 200 reduced by 50%), the cumulative sampling quantity 267*a* to have a normalized value of 108 (e.g., integer value of 215 reduced by 50%), and the cumulative sampling quantity 267*n* to have a normalized value of 109 (e.g., 218 reduced by 50%). Additional normalization techniques or combinations of techniques can be used.

In FIG. 2, the graphics generation computing device 210 generates or modifies the set of point samples 215 based on the triangle-level sampling array 260, such as modifying the set of point samples 215 to include location data or other point sample data for each point sample identified in the triangle-level sampling array 260. In some cases, the highly parallelized processor 230 is configured to perform triangle-level rejection sampling in parallel across the points identified in the triangle-level sampling array 260. In the highly parallelized processor 230, a particular core of the processing cores 240 calculates respective point sample data for each particular point sample indicated by the triangle-level sampling array 260, such as each point sample that is included in the cumulative sampling quantities. In addition, the particular core of the processing cores 240 calculates the respective point sample data based on the triangle-level sampling data that includes the particular point sample, such as by identifying that the particular point sample is within a range of (or otherwise included in) the cumulative sampling quantity from triangle-level sampling data at a particular record of the triangle-level sampling array 260. In some cases, based on the triangle-level sampling data at the particular record, the particular processing core of the processing cores 240 identifies a relationship among the particular point sample, a particular triangle that includes the particular point sample, and the range (or other portion) of the cumulative sampling quantity that includes the particular point sample. For example, the first processing core 240*a* receives data describing a first point sample from the cumulative sampling quantities. In some cases, the data describing the first point sample is a point sample index that identifies the first point sample, such as a processing thread identification value that is associated with the first point sample. In this example, the first processing core 240*a* determines that the first point sample has a point sample index having a value of 217.

Based on the data that describes the first point sample, the first processing core 240*a* generates one or more data values that are included in the set of point samples 215. For example, the first processing core 240*a* determines that the first point sample has a point sample index value that is included in a range of the cumulative sampling quantity 267*n*. In some cases, the first processing core 240*a* determines the range of the cumulative sampling quantity 267*n* by comparing the cumulative sampling quantity 267*n* with one or more additional cumulative sampling quantities, such as an additional cumulative sampling quantity for an additional record modified prior to the record 260*n'*. Based on the above example for generating the triangle-level sampling data 250, the first processing core 240*a* determines that the record 260*n'* was modified subsequent to (e.g., has a record index greater than) the record 260*a'*. By comparing the above example numerical values of 215 and 218 for the cumulative sampling quantities 267*a*, and 267*n*, the first processing core 240*a* determines that the range of the cumulative sampling quantity 267*n* includes point sample index values 216, 217, and 218, e.g., point sample index values that are equal to or less than the cumulative sampling quantity 267*n* and greater than the cumulative sampling quantity 267*a*.

In the highly parallelized processor 230, the first processing core 240*a* determines, based on the range of the cumulative sampling quantity 267*n*, that the first point sample having the point sample index value of 217 is included in the triangle indicated by the triangle index 261n, e.g., the nth triangle. In addition, the first processing core 240a determines one or more data values associated with the indicated triangle, such as area data describing an area, size, or boundary information for the triangle; a position of the triangle, e.g., respective to other triangles withing the set 223; or other data describing characteristics of the indicated triangle. In the highly parallelized processor 230, the processing cores 240 can use the triangle-level sampling array 260 to rapidly identify which point samples are associated with which triangles. In some cases, the triangle-level sampling array 260 can improve efficient use of computing resources for point sample data calculation as compared to contemporary rejection sampling techniques, such as by reducing expenditure of computing resources on calculations for point samples (e.g., in a density map) that are not associated with a triangle (e.g., in a 3D object mesh). For example, by identifying a total quantity of point samples identified by the cumulative sampling quantities in the triangle-level sampling array 260, the highly parallelized processor 230 can eliminate or reduce operations related to point samples that are included in the density map 225 but not associated with a triangle in the triangle set 223.

Based on the portions of the triangle-level sampling data 250 that are included in the record 260n', the first processing core 240a identifies one or more relationships among the first point sample, the nth triangle that includes the first point sample, and the range of the cumulative sampling quantity 267n that includes the first point sample. In addition, the first processing core 240a generates first point sample data for the first point sample based on the identified relationships. For example, the first processing core 240a calculates first location data describing a location of the first point sample within the nth triangle. In some cases, the first location data is calculated via triangle-level rejection sampling that utilizes data included in the triangle-level sampling array 260. For example, the first processing core 240a identifies the maximum density value 264n from the record 260n'. In addition, the first processing core 240a calculates the first location data based on the maximum density value 264n, such as a triangle-level rejection sampling realization pass that calculates a combination (e.g., a mathematical product) of the maximum density value 264n with a statistical distribution function. In the highly parallelized processor 230, the processing cores 240 calculate point sample data for each point sample identified in the triangle-level sampling array 260, based on the respective maximum density value for the respective triangle in which the point sample is included. For each point sample identified in the triangle-level sampling array 260, calculating the point sample data using the respective maximum density value implements a statistical reduction of operations related to determining location data, such as by reducing operations to calculate the statistical distribution function based on the combination with the respective maximum density value. In some cases, calculation of the point sample data, such as location data, based on a respective maximum density value for a respective triangle improves efficient use of computing resources for location data calculation as compared to contemporary rejection sampling techniques, such as by implementing a statistical reduction of processing resources, memory resources, or other computing resources utilized for calculating point sample data.

In the graphics generation computing device 210, the first processing core 240a modifies the set of point samples 215 to include the first point sample data. In addition, additional cores of the processing cores 240 modify the set of point samples 215 to include respective point sample data for each point sample indicated in the triangle-level sampling array 260. The graphics generation computing device 210 provides the modified set of point samples 215 (or a subset thereof) to one or more additional computing devices, such as the additional computing device 105 described in regard to FIG. 1. For example, the graphics generation computing device 210 provides the modified set of point samples 215 to an additional graphics generation computing device, e.g., that is in communication with the graphics generation computing device 210. Additionally or alternatively, the graphics generation computing device 210 provides the modified set of point samples 215 to a computing component of the graphics generation computing device 210, such as to an additional highly parallelized processor or to the highly parallelized processor 230, e.g., for use in additional graphical generation techniques. In some cases, the graphics generation computing device 210 provides the modified set of point samples 215 to an additional computing system, such as a user computing device that is configured to display the 3D graphical object related to the 3D object mesh 220, based on the modified set of point samples 215.

Figure 4:
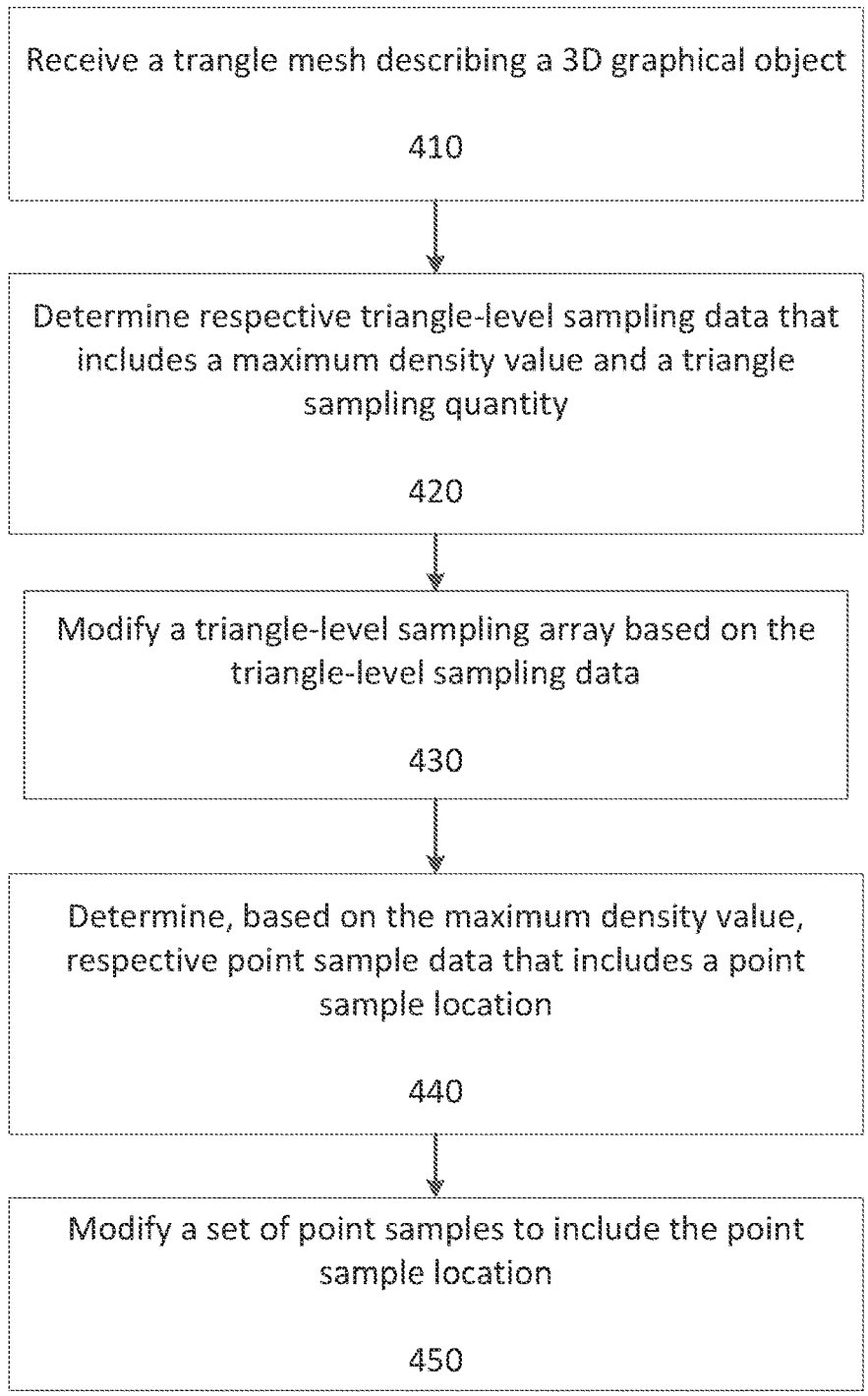
FIG. 4 is a flow chart depicting an example of a process for triangle-level rejection sampling, according to certain embodiments.

FIG. 4 is a flow chart depicting an example of a process 400 for performing triangle-level rejection sampling to generate one or more surface mesh point samples. In some embodiments, such as described in regards to FIGS. 1-3, a computing device executing a graphics generation computing device implements operations described in FIG. 4, by executing suitable program code. For illustrative purposes, the process 400 is described with reference to the examples depicted in FIGS. 1-3. Other implementations, however, are possible.

At block 410, the process 400 involves receiving a triangle mesh, such as a mesh data object that describes a 3D graphical object. In addition, the mesh includes one or more triangles. In some cases, a highly parallelized processor receives the mesh. For example, the highly parallelized processor 230 included in the graphics generation computing device 210 receives the 3D object mesh 220. In addition, the highly parallelized processor 230 identifies, or otherwise receives, the set of triangles 223 that are included in the 3D object mesh 220.

At block 420, the process 400 involves determining, by the highly parallelized processor, respective triangle-level sampling data for each particular triangle included in the mesh. In some cases, multiple processing cores included in the highly parallelized processor are configured to determine the respective triangle-level sampling data. In addition, the respective triangle-level sampling data includes one or more of a maximum density value or a sampling quantity for the particular triangle. In some cases, the respective maximum density value indicates a likelihood of a point sample being located within the particular triangle, e.g., a likelihood for a potential location that is calculated based on the density of potential point samples described by the triangle maximum density value. Additionally or alternatively, the respective sampling quantity indicates a quantity of point samples included in the particular triangle. For example, one or more processing cores of the processing cores 240 generates at least one respective portion of the triangle-level sampling data 250, such as the triangle-level sampling data 250a through 250n respectively generated by the processing cores 240a through 240n. In addition, each respective portion of the triangle-level sampling data 250 includes respective data values for, at least, a maximum density value and a triangle sampling quantity, such as the maximum density data 254a and the sampling quantity data 256a.

At block 430, the process 400 involves modifying, by one or more of the multiple processing cores in the highly parallelized processor, one or more of a triangle-level sampling array or a shared counter data value. In some cases, a particular processing core modifies a respective portion of the triangle-level sampling array that is associated with a particular triangle. For example, the particular processing core modifies the triangle-level sampling array to include the maximum density value for the particular triangle. In addition, the particular processing core modifies the triangle-level sampling array to include a cumulative sampling quantity that is based on the sampling quantity for the particular triangle, such as a cumulative sampling quantity based on a combination of the sampling quantity and an additional cumulative sampling quantity for an additional triangle. For example, the first processing core 240a modifies the record 260a' to include the maximum density value 264a and the cumulative sampling quantity 267a. In addition, the first processing core 240a determines the cumulative sampling quantity 267a based on a sum (or other combination) of the sampling quantity data 256a with an additional cumulative sampling quantity for a previously modified record of the triangle-level sampling array 260', e.g., an additional cumulative sampling quantity indicated via the shared counter 237. Additionally or alternatively, the first processing core 240a modifies a value of the shared counter 237 to indicate the sum (or other combination) of the sampling quantity data 256a with the additional cumulative sampling quantity, e.g., modifying the shared counter 237 to indicate the cumulative sampling quantity including the sampling quantity data 256a. In some cases, one or more processing cores of the processing cores 240 modifies at least one record of the triangle-level sampling array 260, such as modifying a respective record for each particular triangle in the triangle set 223. In some implementations, the triangle-level sampling array is modified, by one or more of the multiple processing cores, to include a normalized value of each cumulative sampling quantity. For example, the highly parallelized processor 230 calculates, for each particular record of the triangle-level sampling array 260, a respective normalized triangle sampling quantity. In addition, the highly parallelized processor 230 modifies the triangle-level sampling array 260 based on the normalized triangle sampling quantity, such as by modifying each particular record to include a respective normalized cumulative sampling quantity that is based on the normalized triangle sampling quantity for the record.

At block 440, the process 400 involves determining, by one or more of the multiple processing cores in the highly parallelized processor, respective point sample data for one or more point samples indicated by the triangle-level sampling array. In addition, the multiple processing cores determine the respective point sample data for each point sample that is indicated by the cumulative sampling quantities included in the triangle-level sampling array. In some cases, the respective point sample data for a particular point sample includes a point sample location for the particular point sample. For example, a particular processing core of the multiple processing cores calculates a respective point sample location for a particular point sample. In addition, the particular processing core calculates the respective point sample location based on the maximum density value that is associated with the particular point sample, such as the maximum density value identified in the triangle-level sampling array for the particular triangle associated with the particular point sample. For example, the first processing core 240a calculates, based on the maximum density value 264n from the record 260n', first location data for the first point sample associated with the nth triangle. In some cases, one or more processing cores of the processing cores 240 determines respective location data for each point sample indicated in the triangle-level sampling array 260. In some implementations, the particular processing core that calculates the respective point sample location for the particular point might or might not be the same particular processing core that calculated triangle-level sampling data for the triangle associated with the particular point sample.

At block 450, the process 400 involves modifying, by the highly parallelized processor, a set of point samples, such as a set of surface mesh point samples that corresponds to the mesh received by the highly parallelized processor. In addition, the highly parallelized processor modifies the set of point samples to include point sample data, such as a point sample location, for one or more of the point samples indicated by the triangle-level sampling array. In some cases, the particular processing core of the multiple processing cores modifies the set of point samples to include the respective point sample location, such as a modification that is subsequent to calculating the respective point sample location for the particular point sample. For example, the first processing core 240a modifies the set of point samples 215 to include the first location data for the first point sample. In some cases, the set of point samples 215 is modified for one or more of the point samples indicated in the triangle-level sampling array 260, such to include respective location data for a particular point sample that is calculated by a particular processing core of the processing cores 240. In some implementations, the set of point samples is provided to one or more additional computing devices, such as an additional computing device or computing component that is configured to perform additional graphical generation techniques.

Figure 5:
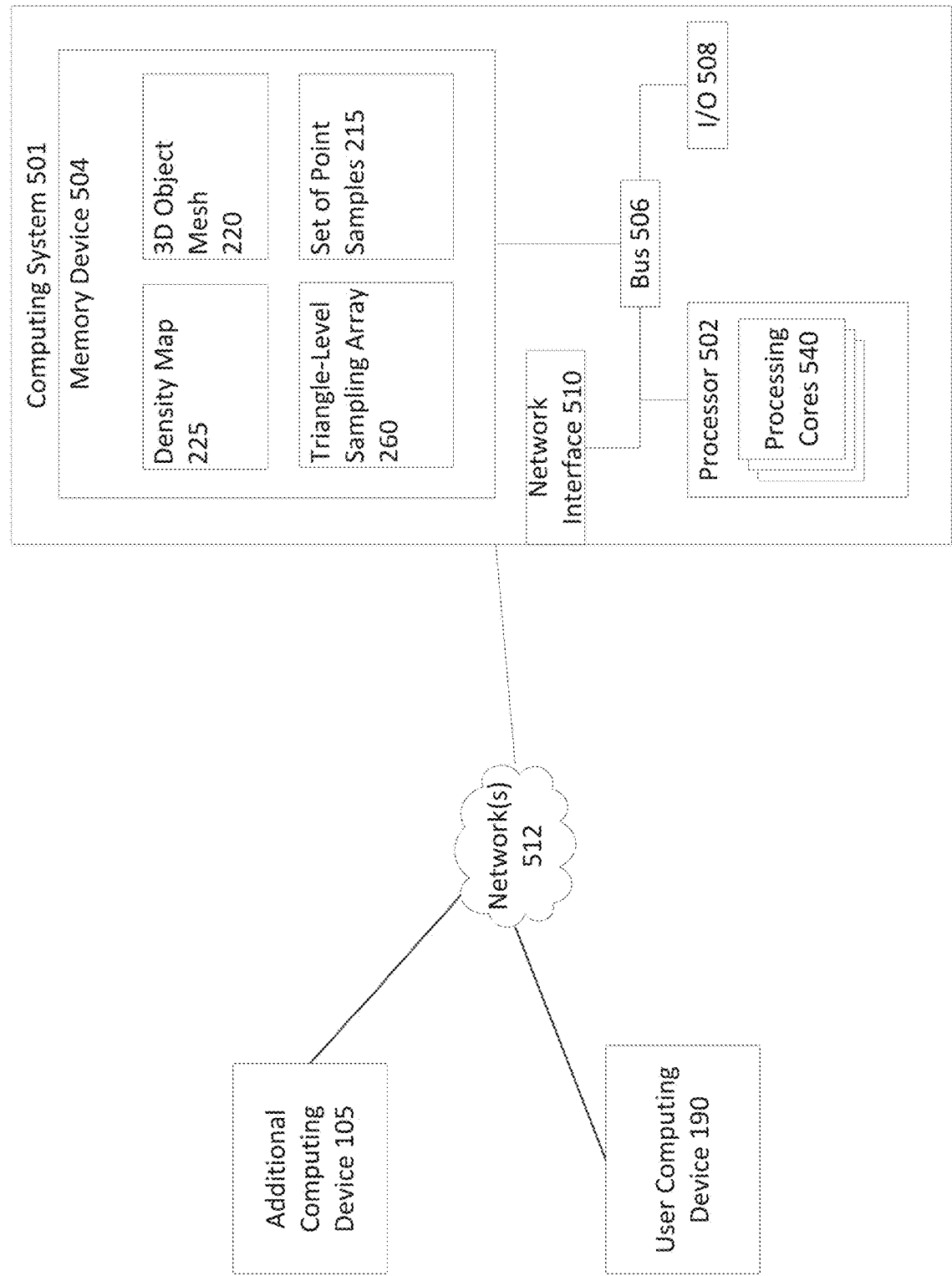
FIG. 5 is a block diagram depicting an example of a computing system for implementing a graphics generation computing device configured to perform triangle-level rejection sampling, according to certain embodiments.

Any suitable computing system or group of computing systems can be used for performing the operations described herein. For example, FIG. 5 is a block diagram depicting a computing system, such as a graphics generation computing system, that is configured to perform triangle-level rejection sampling, according to certain embodiments.

The depicted example of a computing system 501 includes one or more processors 502 communicatively coupled to one or more memory devices 504. In the computing system 501, the one or more processors 502 include at least one highly parallelized processor that includes multiple processing cores, such as multiple processing cores 540. The one or more processors 502 execute computer-executable program code or accesses information stored in the memory device 504. Examples of the one or more processors 502 include a microprocessor, a graphics processing unit ("GPU"), an application-specific integrated circuit ("ASIC"), a field-programmable gate array ("FPGA"), or other suitable processing device. The one or more processors 502 can include any number of processing devices, including one. The processing cores 540 are configured to implement high-efficiency parallel processing of data that is received or generated by the one or more processors 502, such as high-efficiency parallel processing based on an SIMD instruction set.

The memory device 504 includes any suitable non-transitory computer-readable medium for storing the density map 225, the 3D object mesh 220, the triangle-level sampling array 260, the set of point samples 215, and other received or determined values or data objects. In some cases, the memory device 504 is a shared memory location that is accessible by each of the processing cores 540. In the memory device 504, the computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 501 may also include a number of external or internal devices such as input or output devices. For example, the computing system 501 is shown with an input/output ("I/O") interface 508 that can receive input from input devices or provide output to output devices. A bus 506 can also be included in the computing system 501. The bus 506 can communicatively couple one or more components of the computing system 501.

The computing system 501 executes program code that configures the one or more processors 502 to perform one or more of the operations described above with respect to FIGS. 1-4. The program code includes operations related to, for example, one or more of the density map 225, the 3D object mesh 220, the triangle-level sampling array 260, the set of point samples 215, or other suitable applications or memory structures that perform one or more operations described herein. The program code may be resident in the memory device 504 or any suitable computer-readable medium and may be executed by the one or more processors 502 or any other suitable processor. In some embodiments, the program code described above, the density map 225, the 3D object mesh 220, the triangle-level sampling array 260, and the set of point samples 215 are stored in the memory device 504, as depicted in FIG. 5. In additional or alternative embodiments, one or more of the density map 225, the 3D object mesh 220, the triangle-level sampling array 260, the set of point samples 215, and the program code described above are stored in one or more memory devices accessible via a data network, such as a memory device accessible via a cloud service.

The computing system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. One or more additional computing systems are connected to the computing system 501 via network 512, such as the additional computing device 105 or the user computing device 190. The computing system 501 is able to communicate with one or more of the additional computing device 105 or the user computing device 190 using the network interface 510. Although FIG. 5 depicts the additional computing device 105 and the user computing device 190 as connected to the computing system 501 via the networks 512, other embodiments are possible, including an additional computing device or an interface for a user computing device operating as a program in the memory device 504 of the computing system 501.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for generating a set of surface mesh point samples, the system comprising:
   a highly parallelized processor that includes multiple processing cores, the multiple processing cores being configured to determine respective triangle-level sampling data for multiple triangles included in a mesh describing a three-dimensional ("3D") graphical object, wherein for each particular triangle of the multiple triangles, a respective processing core of the multiple processing cores is configured for:
  determining a maximum density value for the particular triangle, the maximum density value indicating a likelihood of a point sample being located within the particular triangle,
  determining a sampling quantity for the particular triangle, the sampling quantity indicating a quantity of point samples included in the particular triangle, and
  modifying a triangle-level sampling array to include (i) the maximum density value for the particular triangle and (ii) a cumulative sampling quantity that is modified based on the sampling quantity for the particular triangle; and
the multiple processing cores being further configured to determine respective point sample data for each point sample indicated by the cumulative sampling quantity,
wherein for each particular point sample indicated by the cumulative sampling quantity, an additional respective processing core of the multiple processing cores is configured for:
  calculating a particular point sample location for the particular point sample, wherein the particular point sample location is calculated based on a respective maximum density value of a respective triangle that is associated with the particular point sample, and
  modifying the set of surface mesh point samples to include the particular point sample location for the particular point sample.

2. The system of claim 1, wherein determining the respective point sample location for each point sample indicated by the cumulative sampling quantity comprises the additional respective processing core being further configured for:
  identifying, based on the cumulative sampling quantity in the triangle-level sampling array, a triangle index indicating the respective triangle that is associated with the particular point sample;
  determining, based on the triangle index, area data describing the respective triangle;
  determining, from the triangle-level sampling array, the respective maximum density value that is associated with the particular point sample; and
  calculating the particular point sample location within the respective triangle based on the area data and the respective maximum density value.

3. The system of claim 1, wherein determining the maximum density value for the particular triangle further comprises the respective processing core being further configured for:
  receiving a density map including multiple texels, wherein each texel of the multiple texels indicates a statistical distribution of potential point sample locations within the texel;
  determining a subset of the multiple texels that correspond to area data describing the particular triangle; and
  identifying, from the subset of the multiple texels, at least one texel indicating a maximum value of the statistical distribution of potential point sample locations within the particular triangle.

4. The system of claim 1, wherein determining the sampling quantity for the particular triangle further comprises the respective processing core being further configured for:
  receiving a density map including multiple texels, wherein each texel of the multiple texels indicates a statistical distribution of potential point sample locations within the texel;
  determining a subset of the multiple texels that correspond to area data describing the particular triangle; and
  calculating the sampling quantity based on a texel-weighted combination of the area data with respective statistical distribution values of each texel of the subset of the multiple texels.

5. The system of claim 1, wherein modifying the triangle-level sampling array further comprises the respective processing core being further configured for:
  calculating the sampling quantity and the maximum density value for the particular triangle;
  modifying, based on the sampling quantity, a shared memory value that is accessible by each of the multiple processing cores, wherein modifying the shared memory value includes generating the cumulative sampling quantity by combining the sampling quantity with a historical cumulative sampling quantity stored in the shared memory value;
  calculating, based on the modified shared memory value, a triangle index for the particular triangle; and
  modifying the triangle-level sampling array to include a record that includes the cumulative sampling quantity, the maximum density value, and the triangle index for the particular triangle.

6. The system of claim 5, wherein each of the multiple processing cores modifies a shared counter of the shared memory value via an atomic instruction of the highly parallelized processor.

7. The system of claim 1, wherein determining the respective point sample location for each point sample indicated by the cumulative sampling quantity further comprises the additional respective processing core being further configured for:
  identifying, based on the cumulative sampling quantity in the triangle-level sampling array, a range of the cumulative sampling quantity that corresponds to the particular point sample;
  identifying, from the triangle-level sampling array and based on the range of the cumulative sampling quantity, a particular maximum density value and a particular triangle index that correspond to the particular point sample; and
  calculate, based on the particular maximum density value and the particular triangle index, the particular point sample location for the particular point sample, wherein the particular triangle index indicates the respective triangle that is associated with the particular point sample and the particular point sample location is located within the respective triangle.

8. A method for generating a set of surface mesh point samples, the method comprising:
  receiving, by a highly parallelized processor, a mesh describing a three-dimensional ("3D") graphical object, the mesh including multiple triangles;
  determining, by multiple processing cores included in the highly parallelized processor, respective triangle-level sampling data for each of the multiple triangles, wherein for each particular triangle of the multiple triangles, a respective processing core of the multiple processing cores determines:

a) a maximum density value for the particular triangle, the maximum density value indicating a likelihood of a point sample being located within the particular triangle, and
b) a sampling quantity for the particular triangle, the sampling quantity indicating a quantity of point samples included in the particular triangle;

modifying, by the multiple processing cores and for each particular triangle of the multiple triangles, a triangle-level sampling array, wherein the respective processing core modifies the triangle-level sampling array to include (i) the maximum density value for the particular triangle and (ii) a cumulative sampling quantity that is modified based on the sampling quantity for the particular triangle;

determining, by the multiple processing cores, respective point sample data for each point sample indicated by the cumulative sampling quantity, wherein for each particular point sample indicated by the cumulative sampling quantity, an additional respective processing core of the multiple processing cores calculates a particular point sample location for the particular point sample, wherein the additional respective processing core calculates the particular point sample location based on a respective maximum density value of a respective triangle that is associated with the particular point sample; and modifying the set of surface mesh point samples to include the particular point sample location for the particular point sample.

9. The method of claim 8, wherein determining the respective point sample location for each point sample indicated by the cumulative sampling quantity further comprises performing, by the additional respective processing core:

identifying, based on the cumulative sampling quantity in the triangle-level sampling array, a triangle index indicating the respective triangle that is associated with the particular point sample;

determining, based on the triangle index, area data describing the respective triangle;

determining, from the triangle-level sampling array, the respective maximum density value that is associated with the particular point sample; and calculating the particular point sample location within the respective triangle based on the area data and the respective maximum density value.

10. The method of claim 8, wherein determining the maximum density value for the particular triangle further comprises performing, by the respective processing core:

receiving a density map including multiple texels, wherein each texel of the multiple texels indicates a statistical distribution of potential point sample locations within the texel;

determining a subset of the multiple texels that correspond to area data describing the particular triangle; and identifying, from the subset of the multiple texels, at least one texel indicating a maximum value of the statistical distribution of potential point sample locations within the particular triangle.

11. The method of claim 8, wherein determining the sampling quantity for the particular triangle further comprises performing, by the additional respective processing core:

receiving a density map including multiple texels, wherein each texel of the multiple texels indicates a statistical distribution of potential point sample locations within the texel;

determining a subset of the multiple texels that correspond to area data describing the particular triangle; and calculating the sampling quantity based on a texel-weighted combination of the area data with respective statistical distribution values of each texel of the subset of the multiple texels.

12. The method of claim 8, wherein modifying the triangle-level sampling array further comprises performing, by the respective processing core:

calculating the sampling quantity and the maximum density value for the particular triangle;

modifying, based on the sampling quantity, a shared memory value that is accessible by each of the multiple processing cores, wherein modifying the shared memory value includes generating the cumulative sampling quantity by combining the sampling quantity with a historical cumulative sampling quantity stored in the shared memory value;

calculating, based on the modified shared memory value, a triangle index for the particular triangle; and modifying the triangle-level sampling array to include a record that includes the cumulative sampling quantity, the maximum density value, and the triangle index for the particular triangle.

13. The method of claim 12, wherein each of the multiple processing cores modifies a shared counter of the shared memory value via an atomic instruction of the highly parallelized processor.

14. The method of claim 8, wherein determining the respective point sample location for each point sample indicated by the cumulative sampling quantity further comprises performing, by the additional respective processing core:

identifying, based on the cumulative sampling quantity in the triangle-level sampling array, a range of the cumulative sampling quantity that corresponds to the particular point sample;

identifying, from the triangle-level sampling array and based on the range of the cumulative sampling quantity, a particular maximum density value and a particular triangle index that correspond to the particular point sample; and calculate, based on the particular maximum density value and the particular triangle index, the particular point sample location for the particular point sample, wherein the particular triangle index indicates the respective triangle that is associated with the particular point sample and the particular point sample location is located within the respective triangle.

15. A non-transitory computer-readable medium embodying program code for generating a set of surface mesh point samples, the program code comprising instructions which, when executed by a highly parallelized processor, cause the highly parallelized processor to perform:

receiving, by the highly parallelized processor, a mesh describing a three-dimensional ("3D") graphical object, the mesh including multiple triangles;

determining, by multiple processing cores included in the highly parallelized processor, respective triangle-level sampling data for each of the multiple triangles, wherein for each particular triangle of the multiple triangles, a respective processing core of the multiple processing cores determines:
  a) a maximum density value for the particular triangle, the maximum density value indicating a likelihood of a point sample being located within the particular triangle, and
  b) a sampling quantity for the particular triangle, the sampling quantity indicating a quantity of point samples included in the particular triangle;
modifying, by the multiple processing cores and for each particular triangle of the multiple triangles, a triangle-level sampling array, wherein the respective processing core modifies the triangle-level sampling array to include (i) the maximum density value for the particular triangle and (ii) a cumulative sampling quantity that is modified based on the sampling quantity for the particular triangle;
determining, by the multiple processing cores, respective point sample data for each point sample indicated by the cumulative sampling quantity, wherein for each particular point sample indicated by the cumulative sampling quantity, an additional respective processing core of the multiple processing cores calculates a particular point sample location for the particular point sample, wherein the additional respective processing core calculates the particular point sample location based on a respective maximum density value of a respective triangle that is associated with the particular point sample; and
modifying the set of surface mesh point samples to include the particular point sample location for the particular point sample.

16. The non-transitory computer-readable medium of claim 15, wherein determining the respective point sample location for each point sample indicated by the cumulative sampling quantity further comprises instructions for performing, by the additional respective processing core:
  identifying, based on the cumulative sampling quantity in the triangle-level sampling array, a triangle index indicating the respective triangle that is associated with the particular point sample;
  determining, based on the triangle index, area data describing the respective triangle;
  determining, from the triangle-level sampling array, the respective maximum density value that is associated with the particular point sample; and
  calculating the particular point sample location within the respective triangle based on the area data and the respective maximum density value.

17. The non-transitory computer-readable medium of claim 15, wherein determining the maximum density value for the particular triangle further comprises instructions for performing, by the respective processing core:
  receiving a density map including multiple texels, wherein each texel of the multiple texels indicates a statistical distribution of potential point sample locations within the texel;
  determining a subset of the multiple texels that correspond to area data describing the particular triangle; and
  identifying, from the subset of the multiple texels, at least one texel indicating a maximum value of the statistical distribution of potential point sample locations within the particular triangle.

18. The non-transitory computer-readable medium of claim 15, wherein determining the sampling quantity for the particular triangle further comprises instructions for performing, by the respective processing core:
  receiving a density map including multiple texels, wherein each texel of the multiple texels indicates a statistical distribution of potential point sample locations within the texel;
  determining a subset of the multiple texels that correspond to area data describing the particular triangle; and
  calculating the sampling quantity based on a texel-weighted combination of the area data with respective statistical distribution values of each texel of the subset of the multiple texels.

19. The non-transitory computer-readable medium of claim 15, wherein modifying the triangle-level sampling array further comprises instructions for performing, by the respective processing core:
  calculating the sampling quantity and the maximum density value for the particular triangle;
  modifying, based on the sampling quantity, a shared memory value that is accessible by each of the multiple processing cores, wherein modifying the shared memory value includes generating the cumulative sampling quantity by combining the sampling quantity with a historical cumulative sampling quantity stored in the shared memory value;
  calculating, based on the modified shared memory value, a triangle index for the particular triangle; and
  modifying the triangle-level sampling array to include a record that includes the cumulative sampling quantity, the maximum density value, and the triangle index for the particular triangle.

20. The non-transitory computer-readable medium of claim 15, wherein determining the respective point sample location for each point sample indicated by the cumulative sampling quantity further comprises instructions for performing, by the additional respective processing core:
  identifying, based on the cumulative sampling quantity in the triangle-level sampling array, a range of the cumulative sampling quantity that corresponds to the particular point sample;
  identifying, from the triangle-level sampling array and based on the range of the cumulative sampling quantity, a particular maximum density value and a particular triangle index that correspond to the particular point sample; and
  calculate, based on the particular maximum density value and the particular triangle index, the particular point sample location for the particular point sample, wherein the particular triangle index indicates the respective triangle that is associated with the particular point sample and the particular point sample location is located within the respective triangle.

* * * * *